(12) United States Patent
Perrault et al.

(10) Patent No.: US 9,188,490 B2
(45) Date of Patent: Nov. 17, 2015

(54) THERMOWELL INSERT

(71) Applicant: Rosemount Inc., Chanhassen, MN (US)

(72) Inventors: Aaron Andrew Perrault, Shakopee, MN (US); Andrew Steven Dierker, St. Louis Park, MN (US)

(73) Assignee: Rosemount Inc., Chanhassen, MN (US)

( * ) Notice: Subject to any disclaimer, the term of this patent is extended or adjusted under 35 U.S.C. 154(b) by 374 days.

(21) Appl. No.: 13/795,969

(22) Filed: Mar. 12, 2013

(65) Prior Publication Data

US 2014/0269820 A1    Sep. 18, 2014

(51) Int. Cl.
*G01K 1/14*    (2006.01)
*G01K 13/02*    (2006.01)

(52) U.S. Cl.
CPC . *G01K 1/14* (2013.01); *G01K 13/02* (2013.01)

(58) Field of Classification Search
CPC ............ G01K 1/14; G01K 1/16; G01K 13/02
USPC .................................................. 374/54, 208
See application file for complete search history.

(56) References Cited

U.S. PATENT DOCUMENTS

| | | | |
|---|---|---|---|
| 4,510,343 A | 4/1985 | Sivyer | |
| 5,858,311 A | 1/1999 | Bachtel | |
| 6,031,146 A | 2/2000 | Bachtel | |
| 6,231,230 B1 | 5/2001 | Baldock et al. | |
| 7,083,329 B2 | 8/2006 | Primdahl et al. | |
| 2005/0284227 A1 | 12/2005 | Broden et al. | |
| 2007/0252672 A1* | 11/2007 | Nyffenegger | 338/28 |
| 2008/0208111 A1* | 8/2008 | Kamen et al. | 604/29 |
| 2008/0253427 A1* | 10/2008 | Kamen et al. | 374/44 |
| 2009/0296781 A1* | 12/2009 | Weber et al. | 374/185 |
| 2010/0302008 A1 | 12/2010 | Engelstad et al. | |
| 2011/0054822 A1 | 3/2011 | Bauschke et al. | |
| 2011/0122918 A1 | 5/2011 | Murray | |
| 2011/0150033 A1 | 6/2011 | Egan et al. | |
| 2012/0300808 A1 | 11/2012 | Martensson | |
| 2013/0014528 A1* | 1/2013 | Stabacinskiene et al. | 62/129 |

FOREIGN PATENT DOCUMENTS

EP    1074825 A1    2/2001
WO    WO2010144121 A2    12/2010

OTHER PUBLICATIONS

International Search Report and Written Opinion for PCT Application Serial No. PCT/US2014/015947, Dated May 28, 2014, 13 pages.

* cited by examiner

*Primary Examiner* — Lisa Caputo
*Assistant Examiner* — Philip Cotey
(74) *Attorney, Agent, or Firm* — Kinney & Lange, P.A.

(57) ABSTRACT

A temperature sensing system comprises a thermowell, a sensor, and a solid insert. The thermowell extends into a sensing region of a fluid flow. The sensor has a probe housed in the thermowell to sense a temperature in the sensing region. The solid insert is configured to removably support the probe within the thermowell and to provide a thermal contact between the thermowell and the probe.

23 Claims, 3 Drawing Sheets

THERMOWELL INSERT

BACKGROUND

The present invention relates generally to process sensor systems, and more particularly to thermowell sensor housings for fluid sensors in industrial process monitoring systems.

Industrial process transmitters and sensor assemblies are used to sense various characteristics of process fluids flowing through a conduit or contained within a vessel, and to transmit information about those process characteristics to a control, monitoring and/or safety system remotely located from the process measurement location. Each process transmitter may be connected to one or more sensor and/or actuator assembly. Sensor assemblies may sense a variety of process parameters, including pressure, temperature, pH or flow rate. Process transmitters are typically electrically connected sensor assemblies via sensor wires used to transmit current- or voltage-based analog sensor output signals reflecting at least one such process parameter. Each transmitter reads these sensor output signals, and converts them into a digital measurement of the process parameter. Finally, the transmitter sends the information to the control system.

Sensor assemblies for sensing process fluid temperatures and changes in temperature commonly include at least one temperature sensor housed in a thermowell extending into the fluid flow. Thermowells are designed to be in physical contact with process fluids and to shield the temperature sensor from physical damage caused by direct contact with the fluid, e.g., impacts, corrosion, etc., while efficiently conducting heat between the fluid and the temperature sensor. Thermowells may sometimes vibrate as a result of process fluid flow, and tend to act as thermal barriers that lengthen sensor response times by increasing the thermal mass of the sensor assembly. Some sensor assemblies have included damping fluids such as mineral oils to improve thermal conduction between thermowells and temperature sensors, and to protect alleviate thermowell vibration.

SUMMARY

The present invention is directed toward a temperature sensing system with a thermowell, a sensor, and an solid insert. The thermowell extends into a sensing region of a fluid flow. The sensor has a probe housed in the thermowell to sense a temperature in the sensing region. The solid insert is configured to removably support the probe within the thermowell and to provide a thermal contact between the thermowell and the probe.

DETAILED DESCRIPTION

Figure 1:
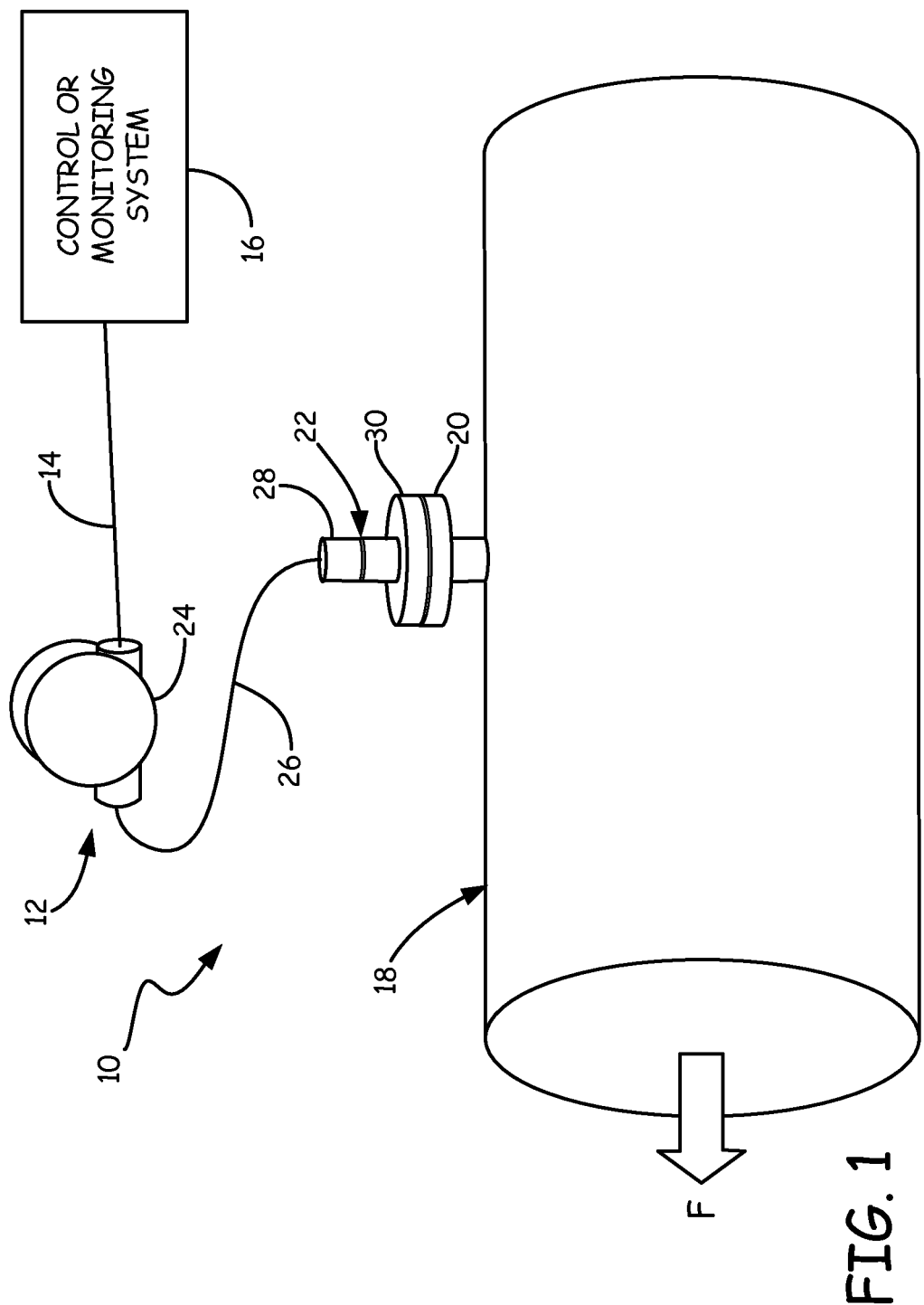
FIG. 1 is a simplified view of a process monitoring or control system.

FIG. 1 is a simplified schematic depiction of one embodiment of process system 10, a system for monitoring and/or actuating an industrial fluid process. In the depicted embodiment, process system 10 includes process measurement system 12 (with process transmitter 24, transmission line 14, and control or monitoring system 16), process piping 18 (with flange connection 20), sensor assembly 22 (with temperature sensor 28, and thermowell 30), and sensor wires 26.

Process piping 18 carries process flow F for an industrial fluid process. Process piping 18 may, for instance, be a tube or duct configured to carry a viscous fluid such as an oil slurry or a viscous manufacturing material. Process piping 18 includes at least one flange connection 20 that facilitates the connection of a flange-mounted instrument to measure at least one characteristic of process flow F, for example, temperature, flow rate, pressure, or pH. In the illustrated embodiment, flange connection 20 provides an attachment point for sensor assembly 22. Sensor assembly 22 attaches to flange connection 20 in such a way as to form a fluid seal with flange connection 20, and extends through piping 18 into process flow F. Sensor assembly 22 includes at least one temperature sensor 28 with a sensor probe (see probe 44 of FIG. 2, discussed below) sheathed in thermowell 30. Temperature sensor 28 may, for instance, be a thermocouple, resistive temperature detector, or thermistor. Temperature sensor 28 produces a process signal reflecting at least one temperature or change in temperature of process flow F proximate flange connection 20. Thermowell 30 protects temperature sensor 28 from process flow F, preventing damage and increasing the expected lifetime of temperature sensor 28. Process flow F may, for instance, include chemicals or particulates damaging or otherwise detrimental to the operation of temperature sensor 28. Thermowell 30 is formed of a material with high thermal conductance, such as brass, steel, or copper, so as to efficiently conduct heat from process flow F to temperature sensor 28. Because thermowell 30 shields temperature sensor 28 from direct contact with process flow F, thermowell 30 acts as a thermal barrier that increases response time and potentially introduces error into measurements taken from temperature sensor 28. These effects are mitigated by improving the thermal contact between temperature sensor 28 and thermowell 30 as described below with respect to FIGS. 3 and 4.

In the depicted embodiment, process measurement system 12 is connected to temperature sensor 28 of sensor assembly 22 by sensor wires 26, and processes signals from temperature sensor 28 to produce at least one measurement of a parameter of process flow F. Sensor wires 26 may, for instance, be single- or multi-wire conductive lines electrically connecting temperature sensor 28 to process transmitter. Process transmitter 24 is a signal processing and/or transmission device. Process transmitter 24 may, for instance, be a logic-capable device configured to extract a digital process measurement from voltage or current signals received from temperature sensor 28 via sensor wires 26. In another embodiment, process transmitter 24 may receive a digital process measurement directly from temperature sensor 28 via sensor wires 26. Process transmitter 24 may further include diagnostic or failure reporting components, and may include persistent memory to store measurement, control, and diagnostic data relating to process flow F. Although process transmitter 24 is shown separated from sensor assembly 22, some embodiments of process system 10 may utilize process transmitters mounted directly to sensor assembly 22 or piping 18. Process transmitter 24 may include an internal power source, or may receive power from an external grid connection or energy harvesting device. Although process transmitter 24 is only shown with connections to temperature sensor 28 and control or monitoring system 16, some embodiments of process transmitter 24 may service additional sensors and/or actuators in contact with process flow F.

Process transmitter 24 transmits the digital process measurement to control or monitoring system 16 via transmission line 14. Transmission line 14 may, for instance, be a multi-wire cable, fiber optic cable, or a wireless connection. In some embodiments, transmission line 14 may be a wireless connection operating on a WirelessHART protocol (IEC 62591) or similar transmission/reception protocol. In addition to the digital process measurement produced from the sensor output of temperature sensor 28, transmission line 14 may carry diagnostic information for process measurement system 12 and sensor assembly 22, and commands from control or monitoring system 16 such as reset and calibration commands, actuator commands, and data requests.

Process measurement system 12 receives and interprets process signals from temperature sensor 28 of sensor assembly 22. As described in detail below with respect to FIGS. 2-4, an insert interposed between thermowell 30 and probe 44 of temperature sensor 28 improves thermal contact between temperature sensor 28 and thermowell 30, thereby improving measurement response time and reducing error. This insert also protects temperature sensor 28 from harmful vibration.

Figure 2:
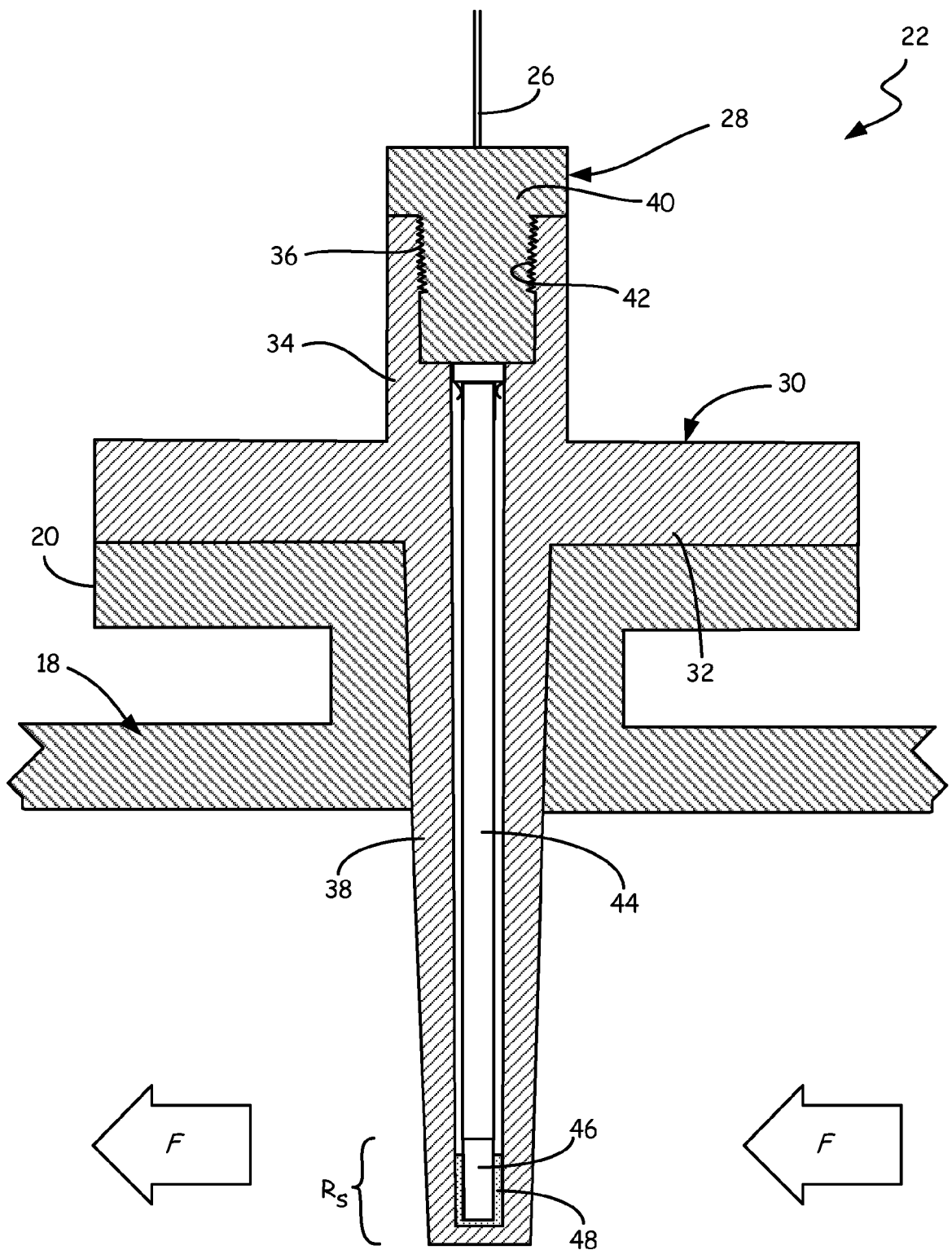
FIG. 2 is a simplified cross-sectional view of a thermowell and temperature probe of the process monitoring or control system of FIG. 1.

FIG. 2 is a cross-sectional view of one embodiment of sensor assembly 22 depicting thermowell 30 (with flange interface 32, sensor mount 34, threaded grooves 36, and probe sheath 38), temperature sensor 28 (with cap 40, threading 42, probe 44, and sensing tip 46), and sensor wire 26. Thermowell 30 is mounted to flange connection 20, and extends through piping 18 into process flow F. Sensing tip 46 of temperature sensor 28 is retained against vibration in thermal contact with probe sheath 38 near sensing region $R_S$ of process flow F by insert 48.

As described above with respect to FIG. 1, thermowell 30 acts as a protective shield that extends through piping 18 into process flow F and sheaths probe 44 of temperature sensor 28 to prevent damage to temperature sensor 28 from contact with process flow F. Thermowell 30 is thermally conductive structure with a hollow bore defining probe sheath 38. Temperature sensor 28 extends, within probe sheath 38, to sensing region $R_S$, such that sensor signals from temperature sensor 28 reflect temperatures or changes in temperature in sensing region $R_S$.

In the depicted embodiment, thermowell 30 includes flange interface 32, a broad cylindrical surface that forms a face seal with flange connection 20. Flange interface 32 may be supplemented with further seals or gaskets to prevent fluid egress from piping 18. In some embodiments, flange interface 32 may be bolted or clamped to flange connection 20 to secure thermowell 30. In alternative embodiments, flange interface 32 may comprise a threaded or slotted geometry selected to mate with corresponding geometry of flange connection 20. Although most embodiments of thermowell 30 are designed to be readily removable from piping 18, some alternative embodiments of thermowell 30 may be welded to flange connection 20.

Sensor mount 34 extends from flange interface 32 away from piping 18, and provides an attachment point for temperature sensor 28. In the depicted embodiment, cap 40 of temperature sensor 28 fits into sensor mount 34 of thermowell 30 such that threading 42 on cap 40 mates with threaded grooves 36 on sensor mount 34. In alternative embodiments, cap 40 may attach to sensor mount 34 in other ways, such as with a bayonet lock or a clamped friction fit. Probe sheath 38 extends from flange interface 32 through piping 18 into process flow F, positioning sensing tip 46 near sensing region $R_S$. Probe sheath 38 is a rigid, substantially cylindrical element that surrounds and protects probe 44 and sensing tip 46. In the depicted embodiment, probe sheath 38 tapers towards sensing region $R_S$, such that the thickness of probe sheath 38 is narrowest adjacent sensing tip 46. This narrowing allows reduces the thermal barrier presented by probe sheath 38, shortening response time increases caused by the thermal mass of thermowell 30 near sensing tip 46. Thermowell 28 may be formed in a single piece, e.g. by metal casting. Alternatively, thermowell 28 may be formed by joining a plurality of separate pieces. Process flow F can generate large amplitude vibrations in thermowell 30, particularly where natural process flow frequencies match resonant frequencies of probe sheath 38. This vibration can cause mechanical impacts between probe sheath 38 and sensing tip 48 that may damage temperature sensor 28. Insert 48 alleviates this damage by constantly retaining sensing tip 46 relative to probe sheath 38, thereby preventing damaging impacts.

Temperature sensor 28 extends within thermowell 30 through piping 18 and into process flow F. Probe 44 is an elongated cylinder or polygonal tube extending from cap 40 to sensing region $R_S$. Sensing tip is thermally conductive sleeve that houses a sensor element (e.g. a thermocouple or thermistor, not shown). Cap 40 and probe 44 cooperate to provide an electrical connection between sensor wires 26 and sensing tip 46. Sensing tip 46 provides a current or voltage signal reflecting a temperature or change in temperature at its location.

Insert 48 surrounds sensing tip 46, protects sensing tip 46 from vibration of thermowell 30, and provides an improved thermal interface between sensing tip 46 and probe sheath 38 by providing a broader area for heat transfer between sensing tip 46 and probe sheath 38. Insert 48 may, for instance, be a solid metal component formed of a material with a high heat transfer coefficient, such as silver or copper. Insert 48 may itself be removable from thermowell 30, and temperature sensor 28 can be removed from and/or inserted into insert 48 without detaching thermowell 30 from piping 18, as described below with respect to FIGS. 3 and 4.

Figure 3:
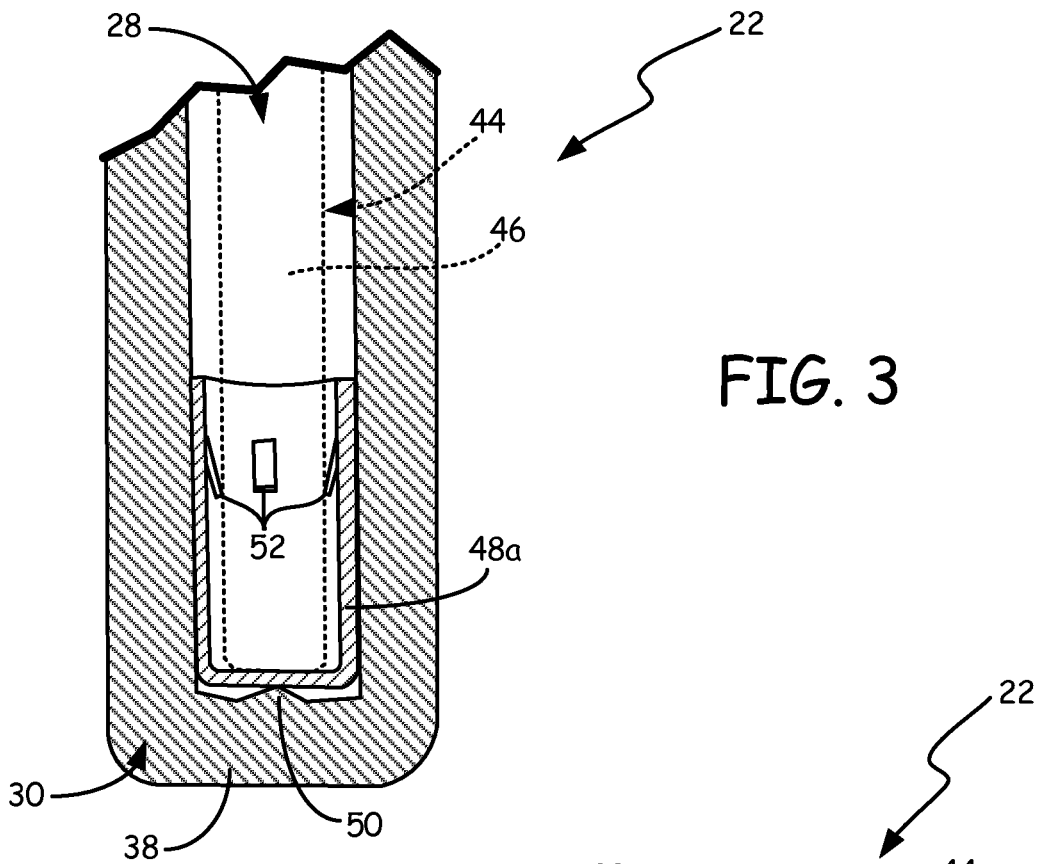
FIG. 3 is a cross-sectional view of one embodiment of the tip of the temperature probe and thermowell of FIG. 2
Figure 4:
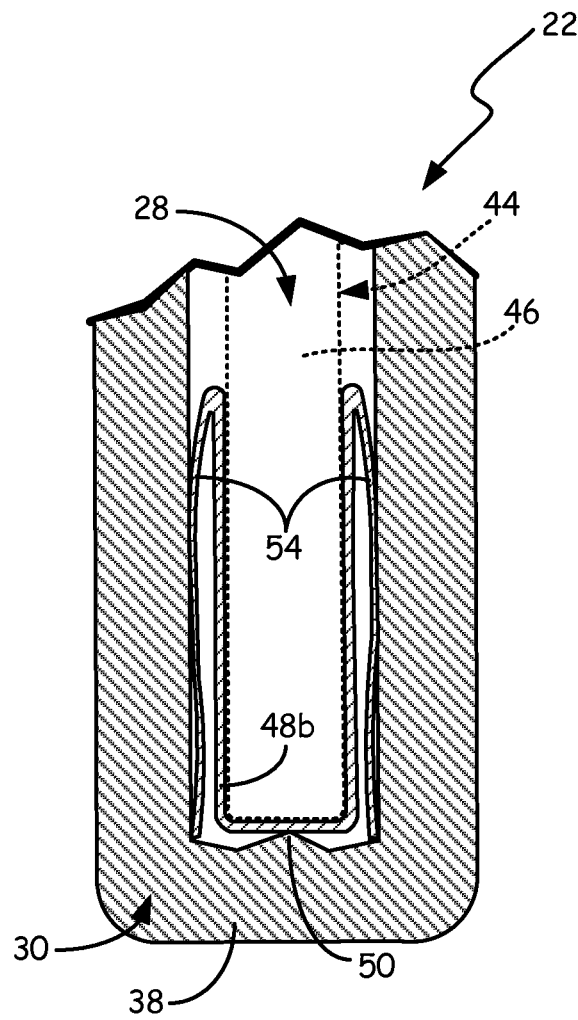
FIG. 4 is a cross-sectional view of a second embodiment of the tip of the temperature probe and thermowell of FIG. 2

FIGS. 3 and 4 illustrate two possible embodiments of a region of sensor assembly 22 near sensing region $S_R$ (see FIG. 2). FIGS. 3 and 4 depict sensor probe 44 and sensing tip 46 of temperature sensor 28, probe sheath 38 and peak 50 of thermowell 30, and insert 48. FIG. 3 depicts insert 48a, a first embodiment of insert 48, while FIG. 4 depicts insert 48b, a second embodiment of insert 48. Inserts 48a and 48b differ in shape, but serve the same general functions: retaining sensing tip 46 relative to probe sheath 38, and providing a thermal interface between sensing tip 46 and probe sheath 38. In both embodiments, peak 50 is a protruding point extending from probe sheath 38 to towards sensing tip 46. Peak 50 provides a single point thermal contact between thermowell 30 and sensing tip 46.

As depicted in FIG. 3, insert 48a is a cylindrical sleeve with spring tabs 52. Spring tabs 52 are thin, and therefore slightly flexible, metal tabs that bend to receive temperature sensor 28. Insert 48a surrounds sensing tip 46, and closely abuts probe sheath 38. Spring tabs 52 extend inward from insert 48 toward sensing tip 46 and downward toward the distal end of sensing tip 46. This geometry allows spring tabs 52 to be slightly flexibly deformed by insertion of temperature sensor 28 into insert 48a. Spring tabs 52 retain temperature sensor 28 laterally relative to the sides of probe sheath 38, thereby preventing mechanical impacts between sensing tip 46 and sensing sleeve 38 from high amplitude vibration of thermowell 30. Spring tabs 52 also act as additional thermal contact points between thermowell 30 and sensing tip 46, improving heat flow from process flow F to sensing tip 46 and reducing response time of sensor assembly 22. Spring tabs 52 do not impede removal of temperature sensor 28 from thermowell 30. Temperature sensor 28 can be removed and/or replaced for maintenance without removing or damaging insert 48*a*. Although spring tabs 52 may accommodate a narrow range of widths of sensing tip 46, various shapes and sizes of insert 48*a* can be interchangeably swapped in or out to accommodate narrower or wider sensing tips 46. In some embodiments, insert 48*a* may be inserted into thermowell 30 in preparation for receiving temperature sensor 28. In other embodiments, insert 48*a* may be affixed to sensing tip 46 and installed by inserting temperature sensor 28 and insert 48*a* into thermowell 30 together.

As depicted in FIG. 4, insert 48*b* is a cylindrical sleeve with integral wave springs 54 extending radially outward and towards the distal end of thermowell 30 to abut probe sheath 38. Wave springs 54 bend to fit into probe sheath 38, and extend to abut the sides of probe sheath 38. Like spring tabs 52 of insert 48*a*, wave springs 54 are relatively thin and therefore flexible metal components that bend to accommodate insertion of temperature sensor 28 into thermowell 30. Whereas insert 48*a* directly abuts probe sheath 38 and contacts sensing tip 46 only via spring tabs 52 and at its distal end, insert 48*b* directly abuts sensing tip 46 and only contacts probe sheath 38 at peak 50 and via wave springs 54. Like spring tabs 52, wave springs 54 provide an additional thermal path between thermowell 30 and sensing tip 46, in addition to retaining sensing tip 46 to prevent impact with probe sheath 38. Like insert 48*a*, insert 48*b* does not impede the insertion or removal of temperature sensor 28 from thermowell 30, and can itself be removed from thermowell 30, e.g. to swap in a larger or smaller insert 48*b* to accommodate a temperature sensor 28 with a narrower or wider sensing tip 46. Insert 48*b* can be fitted snugly to sensing tip 46 and inserted into thermowell 30 together with temperature sensor 28, or inserted separately.

FIGS. 3 and 4 illustrate two possible embodiments of insert 48. A person skilled in the art will recognize that other shapes and configurations of insert 48 may also be used without departing from the spirit of the present invention. In general, insert 48 includes some flexible spring or equivalent component to accommodate vibration and retain sensing tip 46 with respect to probe sheath 38. Insert 48 is preferably formed of a material with high thermal conductance such as silver or copper, and provides a thermal path between sensing tip 46 and probe sheath 38 that shortens the response time of temperature sensor 28 to temperatures and changes in temperature of process flow F.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature sensing system comprising:
   a thermowell extending into a sensing region of a fluid flow, and having a hollow bore defining an interior wall of the thermowell;
   a sensor having a probe housed in the hollow bore of the thermowell to sense a temperature in the sensing region; and
   a solid insert configured to provide a thermal contact between the thermowell and the probe, and to engage and support the probe within the thermowell via at least one spring element that biases the probe away from the interior wall.

2. The temperature sensor system of claim 1, wherein the solid insert is formed of metal.

3. The temperature sensor system of claim 2, wherein the solid insert is formed of silver or copper.

4. The temperature sensor system of claim 1, wherein the solid insert is situated between the sensor and the probe sheath.

5. The temperature sensor system of claim 4, wherein the solid insert is configured to support a tip of the probe at a distal portion of the thermowell.

6. The temperature sensor system of claim 5, wherein the solid insert comprises a sleeve that encloses a sensing tip at a distal end of the probe.

7. The temperature sensor system of claim 6, wherein the sleeve abuts a peak at the distal end of the thermowell.

8. The temperature sensor system of claim 1, wherein the sleeve directly abuts the sensing tip, and the spring elements are wave springs extending from the sleeve to the thermowell.

9. The temperature sensor system of claim 8, wherein the wave springs extend distally from the sleeve to the thermowell.

10. The temperature sensor of claim 1, wherein the sleeve directly abuts the thermowell, and the spring elements are spring tabs extending from the sleeve to the sensing tip.

11. The temperature sensor of claim 10, wherein the spring tabs extend towards the distal end of the sensing tip.

12. A process measurement system comprising:
   a thermowell extending into piping carrying a process flow;
   a sensor assembly with a probe extending into the thermowell to sense a temperature of the process flow;
   a solid insert configured to provide a thermal contact between the thermowell and the probe, and to engage and support the probe within the thermowell via at least one spring element that biases the probe away from the a wall of the thermowell; and
   a process transmitter for receiving a sensor signal from the sensor assembly and transmitting a temperature measurement output based on the sensor signal.

13. The process measurement system of claim 12, wherein the thermowell includes a hollow bore defining a probe sheath that surrounds the probe and extends into the process flow.

14. The process measurement system of claim 13, wherein the solid insert provides a plurality of thermal contacts between the hollow bore and a sensing tip at a distal end of the probe.

15. The process measurement system of claim 13, wherein the solid insert is a sleeve surrounding and abutting a sensing tip at a distal end of the probe.

16. The process measurement system of claim 15, wherein the spring elements comprise wave springs extending from the sleeve to the probe sheath.

17. The process measurement system of claim 13, wherein the solid insert is a sleeve surrounding a sensing tip at a distal end of the probe and abutting the probe sheath.

18. The process measurement system of claim 17, wherein the spring elements comprise spring tabs extending from the sleeve to the sensing tip.

19. The process measurement system of claim 12, wherein the solid insert is formed of metal.

20. The process measurement system of claim 19, wherein the solid insert is formed of silver.

21. The process measurement system of claim 19, wherein the solid insert is formed of copper.

22. The process measurement system of claim 12, wherein the solid insert is removable from the thermowell without damaging the thermowell or the solid insert.

23. The process measurement system of claim 12, wherein the sensor can be removed from and replaced in the thermowell without damaging or replacing the solid insert.

* * * * *